United States Patent [19]

Miyake et al.

[11] Patent Number: 4,669,499

[45] Date of Patent: Jun. 2, 1987

[54] VALVE CASING FOR USE IN A BUTTERFLY VALVE

[75] Inventors: Katsunobu Miyake; Hiroshi Horii; Kenji Ikoma, all of Osaka, Japan

[73] Assignee: Kurimoto, Ltd., Japan

[21] Appl. No.: 784,122

[22] Filed: Oct. 4, 1985

[51] Int. Cl.$^4$ .............................................. F16L 7/00
[52] U.S. Cl. .................................... 137/375; 251/151; 251/305; 277/184; 403/288
[58] Field of Search ............... 251/148, 151, 304, 305; 137/375; 277/181, 184, 188 R, 189; 403/288

[56] References Cited

U.S. PATENT DOCUMENTS

| | | | |
|---|---|---|---|
| 2,729,238 | 1/1956 | Hite | 251/305 |
| 2,872,229 | 2/1959 | Waser | 277/184 |
| 2,966,169 | 12/1960 | Reece | 251/305 |
| 3,217,739 | 11/1965 | La Valley et al. | 137/375 |
| 3,753,548 | 8/1973 | Jung et al. | 251/305 |
| 3,877,678 | 4/1975 | Jung | 251/305 |
| 3,934,851 | 1/1976 | Illing | 251/305 |
| 4,303,094 | 12/1981 | Rothwell et al. | 251/305 |
| 4,398,696 | 8/1983 | Szilagyi et al. | 277/188 R |

Primary Examiner—Martin P. Schwadron
Assistant Examiner—Sheri M. Novack
Attorney, Agent, or Firm—Jones, Tullar & Cooper

[57] ABSTRACT

This invention is intended to solve the problem that a valve casing for use in a butterfly valve formed by press working, which is advantageous from the standpoint of productivity, thickness and weight, has such as a serious disadvantage of breakage or deformation and lowering in the sealing performance due to release on aging or the seal ring when the valve is mounted on pipe line and clamped from both sides. From this point of view, a valve casing according to this invention is formed into a double structure composed of an inner shell and an outer shell, the inner shell comprising a cylindrical part defining a bore and seal ring receiving portions formed on both ends with their diameters enlarged larger than the cylindrical part substantially forming an S-shape in cross section, the outer shell defining a space by surrounding a whole outer periphery of the inner shell, and the inner shell and the outer shell being superposed to each other at both end of the valve casing.

2 Claims, 9 Drawing Figures

VALVE CASING FOR USE IN A BUTTERFLY VALVE

BACKGROUND OF THE INVENTION

1. Field of the Invention

This invention relates to a valve casing for use in a butterfly valve and, more particularly, to a novel structure of a valve casing formed by press working of metal plate.

2. Description of Prior Art

A valve casing has been conventionally manufactured by casting a metal material such as cast iron or non-ferrous metal and machining a cast product, but recently as a result of advances in the field of sheet pressing, the valve casing is also manufactured by a method wherein a metal plate of iron or non-ferrous metal is formed into a valve casing by press working and a machining process is either omitted or applied at a minimum. By such a method, a large amount of valve casings are now efficiently mass-produced with their dimensional accuracy assured. Thus considerable savings in manufacturing costs as compared with the conventional method by casting and machining are realized.

Furthermore, since the weight of a valve manufactured by the latter method is much lighter, an advantage can be enjoyed when installing it on a pipe line, and since loads applied to the pipe line during operation of the valve are decreased, a further advantage is attained from the standpoint of maintenance.

Notwithstanding such advantages, a valve casing for use in a butterfly valve produced by press working has several disadvantages which are not the case for a valve produced by casting as discussed hereinafter referring to FIG. 7, which shows an ordinary butterfly valve in a fitting state.

In FIG. 7, reference numeral 1a is a valve casing comprising a cylindrical body 6a and a seal ring receiving portions 7a formed by bending both ends thereof making a right angle. Seal rings 9a are fitted in these seal ring receiving portions 7a so as to be in contact with flanges 10a, 10a of a pipe line on both sides. These flanges are provided with a plurality of circular apertures so as to connect one aperture on one side with the other on the corresponding side. The seal rings fitted in the receiving portions perform water sealing being pressed and contacted closely by clamping one aperture portion on the other by way of a bolt 28 and a nut 29. When a clamping force is applied in a horizontal direction, a stress produced thereby is concentrated on a bending line L of each seal ring receiving portion 7a, and accordingly there is the possibility of deformation, breakage or failure due to a reduction in the thickness of the metal plate. In particular, the bending line area is formed thinner than its original thickness by a rolling process using a press in order to enlarge or extend a diameter of each end portion to be larger than the cylindrical body 6a, otherwise a seal ring receiving member formed separately is fixed to this area. It is to be understood that this area is lowest in strength of all parts of the valve casing, and as a result the problem of deformation or breakage occurs easily at this area.

Several attempts have been proposed in order to solve the above-discussed problems. For example, as shown in FIG. 8, a plurality of reinforcing ribs 30 like triangular pieces are fitted by welding to a corner where the cylindrical body 6b is adjacent to the seal ring receiving portion 7b. Alternatively as shown in FIG. 9, a cylindrical body 6c is spread out or diverged from a middle part thereof (Japanese laid open Utility model Publication No. 60-8577 titled "Structure of Valve Casing" disclosed by the applicant).

Both of these prior attempts, however, have the following disadvantages.

In the case of the former (FIG. 8), since variance is produced as a result of resistance to inner pressure, depending on their portions, a large number of ribs are required to the extent that production efficiency is lowered, thus the mass-production thereof is inadequate.

In the case of the latter (FIG. 9), an advantage is attained as a result of resistance to compressive stress since a load applied thereto is divided in the form of a vector. However, since a load applied by fluid pressure to a periphery of a pipe is increased in proportion to the diameter of the pipe, a large amount of load is applied to an inner wall of the spread out portion. Accordingly, it is necessary to calculate a thickness of the metal plate for resistant to such an amount of load, as well as allowance for reduction in thickness, when deciding on thickness considering that the thickness of the metal plate is decreased as the amount of spreading or enlargement is increased, in the process of press working.

A further disadvantage of the valve casing formed by press working exists in that the seal ring easily gets out of place or is broken. Referring to a section 7a or 7c of each seal ring receiving portion shown in FIGS. 7 and 9, since the width $Wa_1$ or $Wc_1$ of the outer diameter side of the seal ring to be received is formed either the same or a little smaller than the width $Wa_2$ or $Wc_2$ of the inner diameter side thereof, the seal ring may be sucked inward by fluid passing through a bore of the valve body, thereby creating the problem of imperfect sealing or breakage of the seal ring. As a problem common in valve casings in general (including one made of cast iron besides one formed by press working), a seal ring inevitably deteriorates by aging with the lapse of time causing thereby lowering in the sealing performance of the valve casing. It becomes necessary to replace the aged seal ring with a new one or to clamp the seal with a clamping bolt to reinforce the lowered sealing performance.

There is also the possibility that when tight fitting of the seal ring is affected due to aging, and a space is produced between the seal ring and the seal ring receiving portion, corrosion eventually occurs therebetween, depending on the material, which results in shortening the life span of the valve. As is well known, such a corrosion problem occurs easily when austenitic stainless steel material is used.

Furthermore, when the temperature or chemical atmosphere is different between the inside and the outside of a pipe line, there still exists a problem of selection of the valve structure and material in view of fitting a valve to the pipe line.

For example, when the temperature of the fluid passing through a bore of a valve is high while outside air temperature is low, energy loss due to heat radiation is increased, and when a temperature of fluid is ordinary while outside air temperature is low, the problem of freezing, or break down of the pipe line may occur.

As for the chemical atmosphere, the selection of material is a difficult problem particularly when the outside atmosphere of the pipe line is alkaline.

SUMMARY OF THE INVENTION

Accordingly, it is an object of this invention to provide a novel structure of a valve casing for use in a butterfly valve which is formed by press working and is adaptable to mass-production, the valve casing being thin in thickness, light in weight, and sufficiently resistant to compressive stress and inner pressure when fitted to a pipe line and clamped from both sides.

Another object of this invention is to provide a structure of a valve casing in which a seal ring received by a seal ring receiving portion is firmly fitted thereto against fluid flow (or carrying away force) and does not get out of place nor is broken.

A further object of this invention is to provide a structure of a valve casing in which trouble is decreased even when there exists a difference in temperature between the fluid passing through a bore of the valve body and the outside atmosphere of the pipe line.

A yet further object of this invention is to provide a structure of a valve casing in which trouble is decreased even when there exists a chemical difference between the fluid passing through a bore of the valve body and the outside atmosphere of the pipe line.

The foregoing first object is accomplished according to this invention by providing a valve casing comprising an outer shell and an inner shell in the form of a double structure, and in which the inner shell comprises a cylindrical part defining a bore (passage) inside and seal ring receiving portions formed on both ends so as to have larger diameters than that of the cylindrical part, the outer shell defining a space by surrounding the outer periphery of the inner shell, and the inner shell and the outer shell being solidly fixed to each other at both ends of the valve casing.

By the foregoing structure, when the valve casing is fitted to a pipe line to be clamped from both sides thereof, compressive stress applied to the seal ring receiving portions is uniformly received or supported by end portions where the outer shell is superposed on the inner shell, thus the stress is shared by both shells reducing the burden to a bending line L of the inner shell by half.

In this connection, since the inner pressure caused by fluid passing through the bore is applied to the cylindrical body of the inner shell, which is not thinned by the spreading out process, the cylindrical part remains sufficiently resistant to the inner pressure making it unnecessary to be particularly thickened or reinforced. In addition, the inner pressure applied to the seal ring receiving portions is supported also by the outer shell from the back side to share the pressure between the inner shell and the outer shell.

To be more specific, as a result of composing a valve casing of an inner shell and an outer shell, even when these shells are of thin material, there is less possibility of breakage or failure of the valve casing in the event of the application of an abnormal bending load to the pipe line due to an earthquake or the like. A still further object of this invention is to attain a construction by which tight fitting between a seal ring and a seal ring receiving portion is not negatively affected due to aging of the seal ring resulting in deterioration in the sealing performance.

Furthermore, since the outer shell defines a space by surrounding the entire outer periphery of the inner shell so as to produce a layer of non-thermal conductivity, it is not necessary to take preventive measures for the prevention of energy loss, accidents due to high temperature, production of dew due to decrease in outside air temperature, or freezing requiring heat insulating material.

Moreover, since the inner shell is not influenced by the outside air temperature and kept at the same temperature level as the fluid passing through the bore and the valve plug, the disadvantage of imperfect sealing caused by expansion of the valve casing due to a rise in the outside air temperature or imperfect operation of the valve caused by contraction of the valve casing due to a decrease in the outside air temperature, both frequently occurring in the prior art, is successfully eliminated.

The foregoing objects other than the first object can be attained by effects peculiar to several embodiments of the structure of the valve casing according to this invention described hereinafter together with the accompanying drawings.

BRIEF DESCRIPTION OF THE DRAWINGS

In the drawings forming a part of this application, and in which like parts are designated by common reference numerals.

DESCRIPTION OF THE PREFERRED EMBODIMENTS

Figure 1:
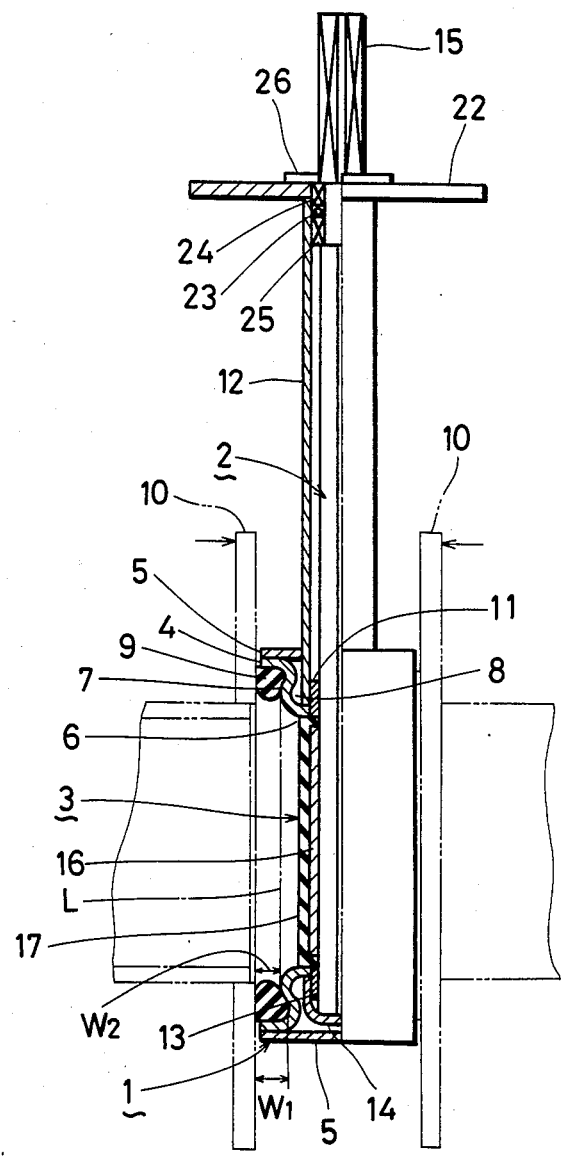
FIG. 1 is a partial sectional front view of a first embodiment of this invention.
Figure 2:
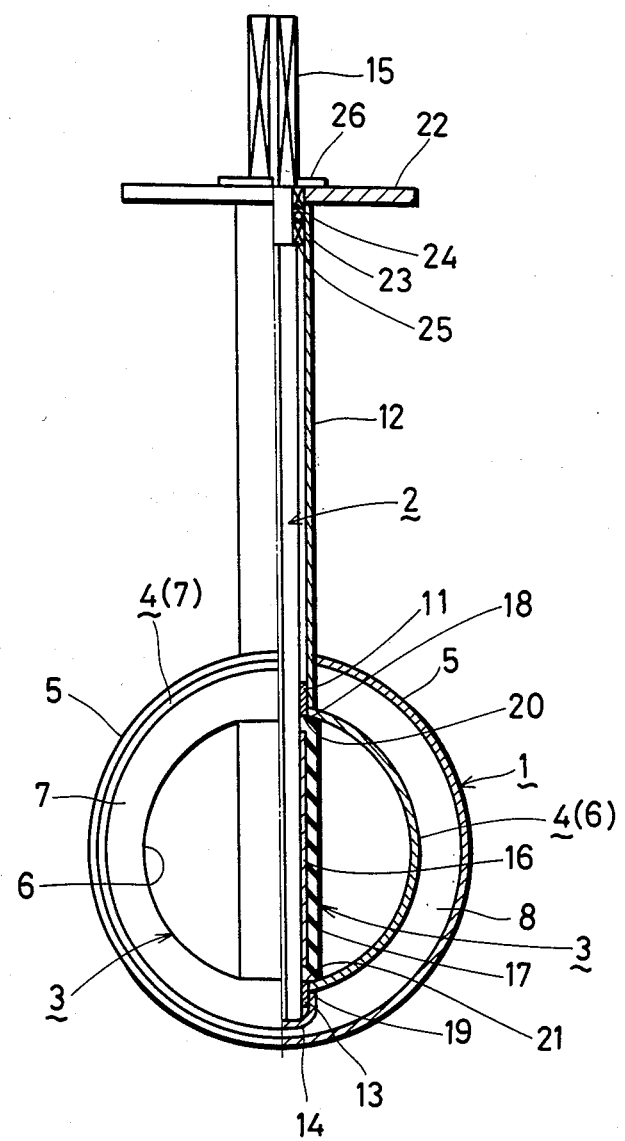
FIG. 2 is a partial sectional side view of the first embodiment.
Figure 3:
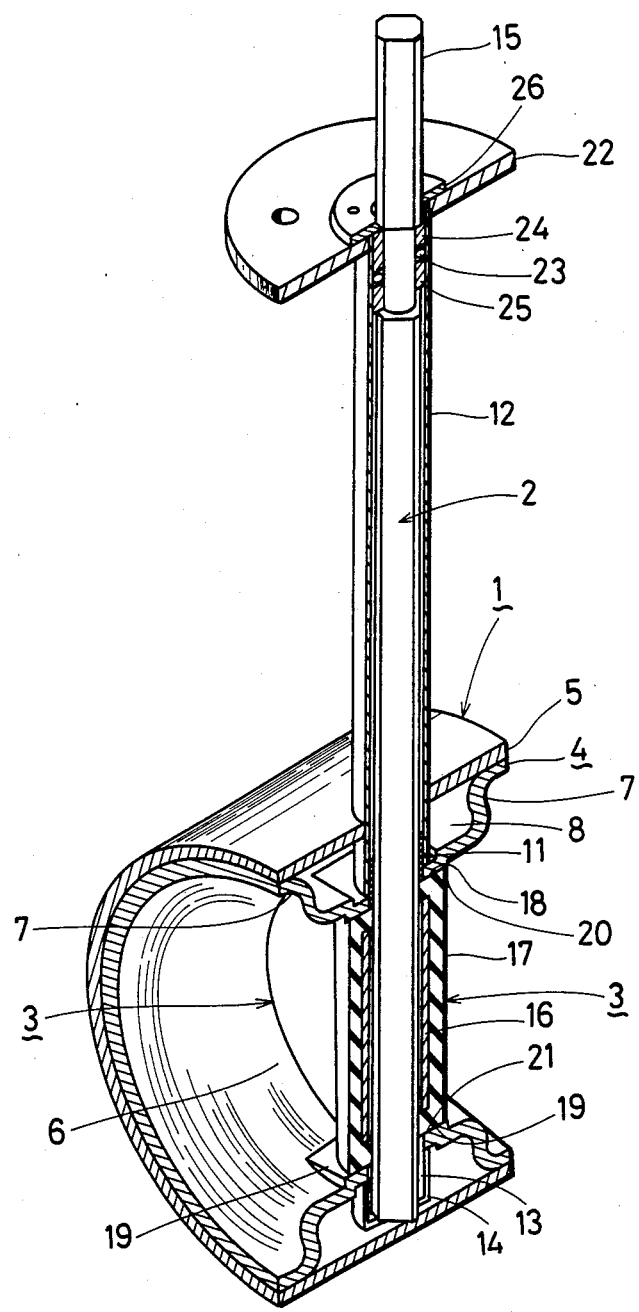
FIG. 3 is a partial cutaway perspective view thereof.

Referring now to FIG. 1 (partial sectional front view), FIG. 2 (partial sectional side view) and FIG. 3 (partial cutaway perspective view), a preferred embodiment of this invention is described in detail hereinafter.

In these drawings, a valve casing 1 comprising an inner shell 4 and an outer shell 5 is fitted to a pipe line being held between flanges 10, 10 of the pipe line.

The inner shell 4 formed into a cylindrical body of thin steel plate defines a bore or a passage inside. A middle part of the shell 4 is used as cylindrical part 6 as it is, and both ends thereof are enlarged to form S-shaped seal ring receiving portions 7, 7 by press working. In this embodiment, this S-shape is inclined or deformed so that width $W_1$ of the outer diameter side of a seal ring 9 to be received in each seal ring receiving portion 7 may be larger than width $W_2$ of the inner diameter side thereof.

Figure 7:
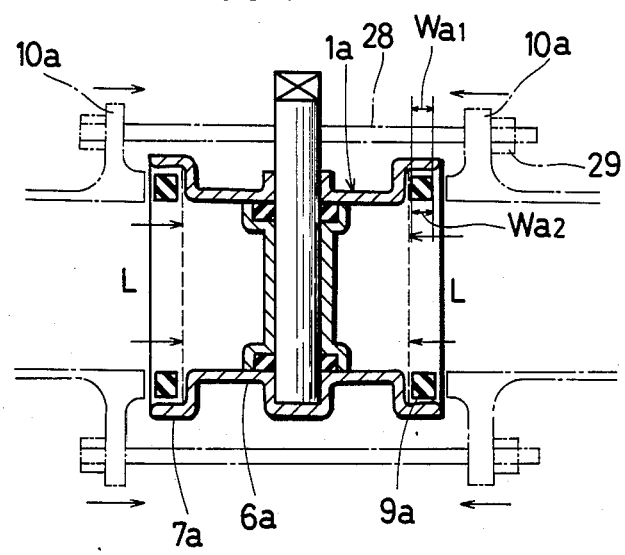
FIGS. 7, 8, 9 are respectively a sectional front view, a partially perspective view and a schematic sectional view of individual prior art valve casings.
Figure 8:
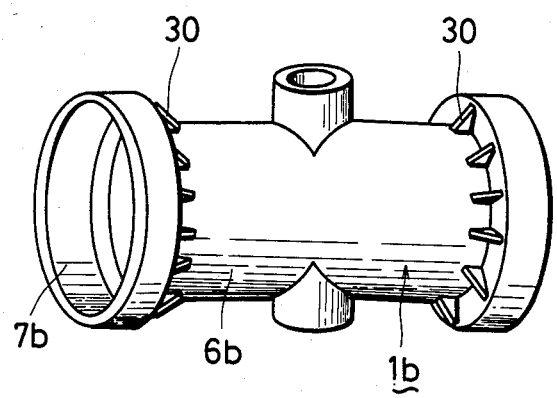
Figure 9:
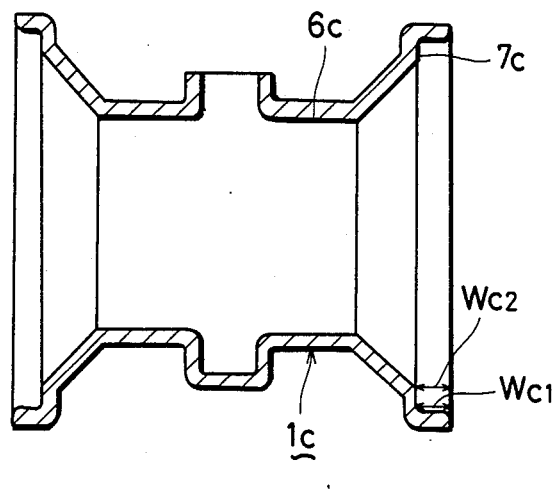

In this connection, in the conventional valve casings shown in FIGS. 7 and 9, since width $Wa_2$ or $Wc_2$ of the inner diameter side is either large or the same as compared with width $Wa_1$ or $Wc_1$ of outer diameter side as shown in sectional view of the seal ring receiving portions 7a or 7c in each drawing, an adhesion resistance to flow (or carrying away force) of liquid is not sufficient, and as a result the seal ring 9a or 9c may get displaced and to lose sealing force or be broken and flow away.

On the other hand, the above-described structure of a seal ring receiving portion of this embodiment, i.e., the narrowed width $W_2$ produces a peculiar effect preventing the above-discussed disadvantage incident to the prior art. Thus the foregoing second object of this invention is attained. Since elasticity is produced on a wall surface of the S-shaped seal ring receiving portion made of a thin metal plate which performs a spring and shock absorbing function thereby considerably improving the tight fit between the seal ring receiving portion and the seal ring inserted therein, the elasticity on the wall surface of the seal ring receiving portion is not lowered even when the elasticity of the seal ring itself is lowered, and the tight fit of the seal ring is maintained over a long period. As a result, it is not necessary to carry out the troublesome work of clamping the fitting portion with a clamping bolt to meet the lowered sealing performance of the valve casing due to aging of the seal ring.

Further, since the bearing factor of a curved projecting portion of the seal ring receiving portion is large as compared with other fitting portions, a joined portion between the metallic part and the seal ring exposed to fluid is tightly fitted, and there is no room for the occurrence of a space therebetween. Accordingly, there is no possibility of corrosion occurring in the space portion contacting the fluid which might occur, depending on the material, if such a space did occur (as is often the case when using austenitic stainless steel). Such a peculiar effect is achieved only when a seal ring is made of thin metal plate which is received in a seal ring receiving portion of a specified shape.

The outer shell 5 formed into a thin cylindrical body composed of steel plate is engagedly fitted to the outer periphery of the inner shell by butt welding.

A valve stem (or valve rod) 2 is a shaft member of square shape in section and is rotatably supported by an upper bearing 12 through an upper bush 11 and by a lower bearing 14 through a lower bush 13, respectively. Drive means (not illustrated) such as a spanner, dedicated lever, wheel and others, are mounted on a driven part 15 protruding from the upper bearing 12 when turning the valve stem 2 in the valve casing 1.

Inner peripheries of both of the upper and lower bushes are also square-shaped corresponding to the outer periphery of the valve stem 2 and are fixed by press fitting. Outer peripheries of the bushes 11, 13 are cylindrically and are rotatable in the upper and lower bearings 12, 14.

The valve disc 3 is fixedly mounted on the valve stem 2 in the valve casing 1 and comprises valve plates 16 formed by a pair of circular thin steel plates holding the valve stem therebetween and a covering member 17 composed of elastic material such as rubber to cover the entire outside of the valve plates.

A part of the inner shell is pressed to form an upper plane face 18 and a lower plane face 19 around the valve stem 2 which penetrates through a cylindrical middle part defining a bore of the inner shell. Further plane faces 20, 21 corresponding to the plane faces 18, 19 are formed on the outer periphery of the valve disc 3 so that the valve casing and the valve disc may slide keeping a sealing state corresponding to the turning movement of the valve stem.

The drive means for turning the valve stem 2 are fitted to a flange 22, and such other parts as seal ring 23, split ring 24, 25, junk ring 26 are fitted immediately beneath the flange 22 for sealing the valve stem and the upper bearing.

Figure 6:
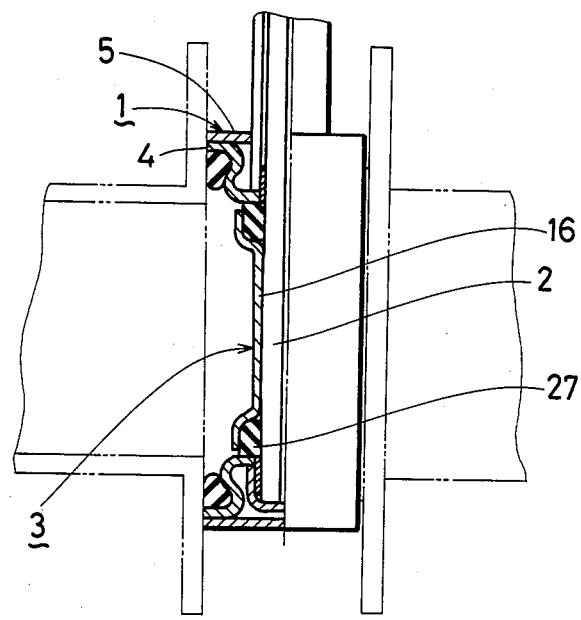
FIG. 6 is a sectional view of a further embodiment.

With regard to members other than the valve casing 1, they can be replaced with a known device as a matter of course. For example, the valve stem 2 can be formed of hexagonal material in place of the above square-shaped material, and the valve disc 3 need not always be covered with the elastic member. In other words, it is also possible to superpose two valve plates and form a recessed groove on the outer periphery thereof so that a seal ring 27 (FIG. 6) is fitted to the groove to slide, keeping the sealing state.

Figure 4:
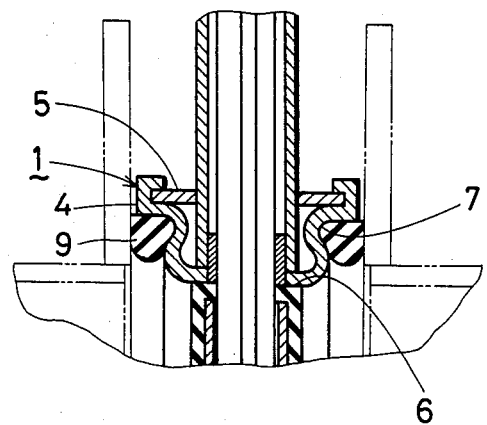
FIG. 4 is a partial sectional view of a second embodiment.
Figure 5:
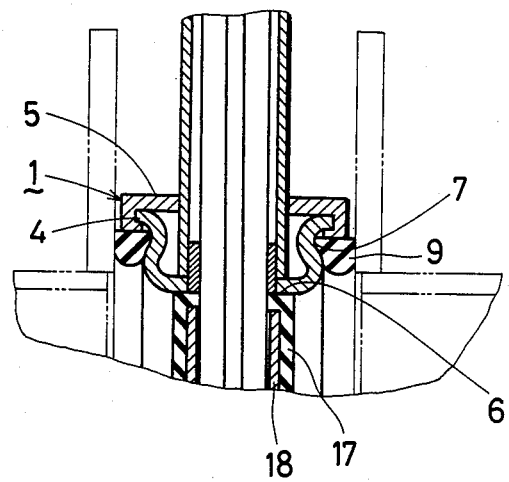
FIG. 5 is a partial sectional front view of a third embodiment.

FIG. 4 shows the second embodiment of this invention according to which an end of each seal ring receiving portion 7 of the inner shell is folded to be -shaped in section, and an end of the outer shell is inserted into a recess produced by such formation to be fixed thereto by welding. FIG. 5 shows the third embodiment wherein the end of the outer shell is folded to be -shaped in section and the end of the seal ring receiving portion 7 is inserted in a recess produced by such a formation to be fixed thereto by welding.

A peculiar advantage attained by such arrangements, i.e., the second and the third embodiments is that since the end portion of the valve casing is composed of three layers by folding the end of either the inner shell or the outer shell, resistance to pressure is increased, and since the end portion is in a state of firm engagement, it is possible to shorten the bead length in the welding process, apply spot welding thereto so as to reduce or simplify the welding process. Furthermore, deformation due to heat can be reduced by the above structures.

In the case of any embodiment described above, it is possible to manufacture the inner shell 4 and the outer shell 5 of different metal material, if necessary, since both of them are formed separately by press working. Numerous assortments or combinations of different metal materials can be suggested such as high-tensile steel with mild steel, stainless steel with mild steel, stainless steel with Monel metal, mild steel with titanium or nickel with copper, so far as the assorted material allows press working of the inner shell.

A peculiar effect can be obtained by the foregoing embodiment such that, for example, the outer shell is made of high-tensile steel which is excellent in strength, while the inner shell is made of mild steel which is suited for plastic deformation working so that the necessary process such as deep drawing may be easily carried out.

A further advantage exists in that it is possible to select a material adapted to the characteristics of the fluid flowing through a pipe and to the outside atmosphere of the pipe. For example, when the fluid is alkaline while the outside air is acid, it is possible to form a valve casing by combining the outer shell of a material resistant to acid with the inner shell of a material resistant to alkali. It is also possible to select a metal plate material with specified resistance to corrosion, heat, abrasion and the like corresponding to a specified condition of the outside air and the bore inside, thus attaining the foregoing objects of this invention.

Finally, in any of the foregoing embodiments, accurate formation by press working is ensured by using adequate molds easily enabling mass-production at reasonable cost, and as a result the above-discussed problems incident to the prior art can be overcome without losing or still maintaining the advantages of a butterfly valve formed by conventional press working.

Having described specific embodiments of this invention, it is believed obvious that modification and variation of this invention are possible in the light of above teachings.

What is claimed is:

1. A valve casing for use in a butterfly valve, comprising:
   a cylindrical valve casing including a bore;
   a valve stem rotatably mounted on the valve casing and extending across the bore at a center part thereof and at a right angle thereon;
   a substantially circular valve disc mounted to the valve casing and slidable within the bore, said valve disc maintaining a sealing state corresponding to the turning movement of the valve stem; and
   a seal ring mounted to the valve casing said seal ring having an inner and an outer diameter; wherein
   the valve casing is formed of a thin metal plate by press working into a double structure comprising an inner shell and an outer shell;
   said inner shell comprising a cylindrical part defining said bore and seal ring receiving portion, each deformed substantially to as S-shape in cross section and formed on both ends with their diameters enlarged;
   the width of the outer diameter of said seal ring received in said seal ring receiving portion is larger than the width of the inner diameter of the seal ring so that the seal ring is tightly fitted into a corresponding S-shaped recess of said seal ring receiving portion;
   said outer shell defines a space with the surrounding outer periphery of said inner shell; and
   said inner shell and said outer shell being superposed and fixed to each other resulting in improved strength and shock absorbing durability and elasticity.

2. The valve casing as defined in claim 1, further wherein:
   said inner shell and said outer shell comprise different metals.

* * * * *